(12) United States Patent
Brenner

(10) Patent No.: US 6,987,820 B1
(45) Date of Patent: Jan. 17, 2006

(54) APPARATUS FOR NAVIGATION SATELLITE SIGNAL QUALITY MONITORING

(75) Inventor: Mats A. Brenner, Plymouth, MN (US)

(73) Assignee: Honeywell International, Inc., Morristown, NJ (US)

( * ) Notice: Subject to any disclaimer, the term of this patent is extended or adjusted under 35 U.S.C. 154(b) by 829 days.

(21) Appl. No.: 09/691,690

(22) Filed: Oct. 18, 2000

(51) Int. Cl.
  *H03D 1/00* (2006.01)
(52) U.S. Cl. ...................................... 375/343
(58) Field of Classification Search ................ 375/343, 375/316, 130, 142, 150; 342/357.61, 357.06, 342/357.12, 362, 357.01
  See application file for complete search history.

(56) References Cited

U.S. PATENT DOCUMENTS

| | | | |
|---|---|---|---|
| 5,402,450 A | | 3/1995 | Lennen |
| 5,414,729 A | | 5/1995 | Fenton |
| 5,600,329 A | | 2/1997 | Brenner |
| 5,630,208 A | | 5/1997 | Enge et al. |
| 5,724,384 A | * | 3/1998 | Kim et al. .................. 375/149 |
| 5,729,571 A | * | 3/1998 | Park et al. .................. 375/149 |
| 5,781,152 A | * | 7/1998 | Renard et al. ......... 342/357.08 |
| 6,047,017 A | | 4/2000 | Cahn et al. |
| 6,198,765 B1 | * | 3/2001 | Cahn et al. ................. 375/142 |
| 6,327,257 B1 | * | 12/2001 | Khalifa ........................ 370/342 |
| 6,345,068 B1 | * | 2/2002 | Molev-Shteiman ......... 375/149 |
| 6,603,803 B1 | * | 8/2003 | Hatch .......................... 375/150 |
| 6,658,048 B1 | * | 12/2003 | Valio .......................... 375/150 |

FOREIGN PATENT DOCUMENTS

| | | |
|---|---|---|
| WO | WO 00/54448 | 9/2000 |
| WO | WO 01/39698 A1 | 6/2001 |

OTHER PUBLICATIONS

Article entitled "Global Positioning System Overview" from http://www.colorado.edu/geography/gcraft/notes/gps/gps.html dated Sep. 1, 2000 by Peter H. Dana, The Geographer's Craft Project, Department of Geography, The University of Colorado at Boulder, Copyright 1999—pp. 1-13.
Figure "GPS Data Bit Demodulation and C/A Code Control Block Diagram" from http://www.colorado.edu/geography/gcraft/notes/gps/gif/costas.gif dated Aug. 31, 2000. Author: Peter H. Dana, Jul. 29, 1995—p. 1 of 1.
Figure "Simplified GPS Receiver Block Diagram" from http://www.colorado.edu/geography/gcraft/notes/gps/gif/receiver.gif dated Aug. 31, 2000. Author: Peter H. Dana, Jul. 29, 1995—p. 1 of 1.
Figure "The Global Positioning System" from http:/www.colorado.edu/geography/gcraft/notes/gps/gif/figure05.gif dated Sep. 5, 2000. Author: Peter H. Dana, May 10, 1998—p. 1 of 1.
Figure "GPS Control" from http:/www.colorado.edu/geography/gcraft/notes/gps/gif/control.gif dated Sep. 5, 2000. Author: Peter H. Dana, Aug. 17, 1994—p. 1 of 1.
Figure "The GPS Navigation Solution" from http://www.colorado.edu/geography/gcraft/notes/gps/gif/figure09.gif dated Sep. 5, 2000. Author: Peter H. Dana, May 10, 1998—p. 1 of 1.

* cited by examiner

*Primary Examiner*—Khai Tran
(74) *Attorney, Agent, or Firm*—Schiff Hardin LLP

(57) ABSTRACT

An apparatus for the detection of positioning system satellite signal distortions includes a correlator that determines a plurality of correlation measurements at points along a correlation curve. The correlation measurements are based upon a correlation between a received satellite signal and a reference. A signal distortion detector determines differences between the correlation measurements along the correlation curve and detects a signal distortion from the differences.

43 Claims, 2 Drawing Sheets

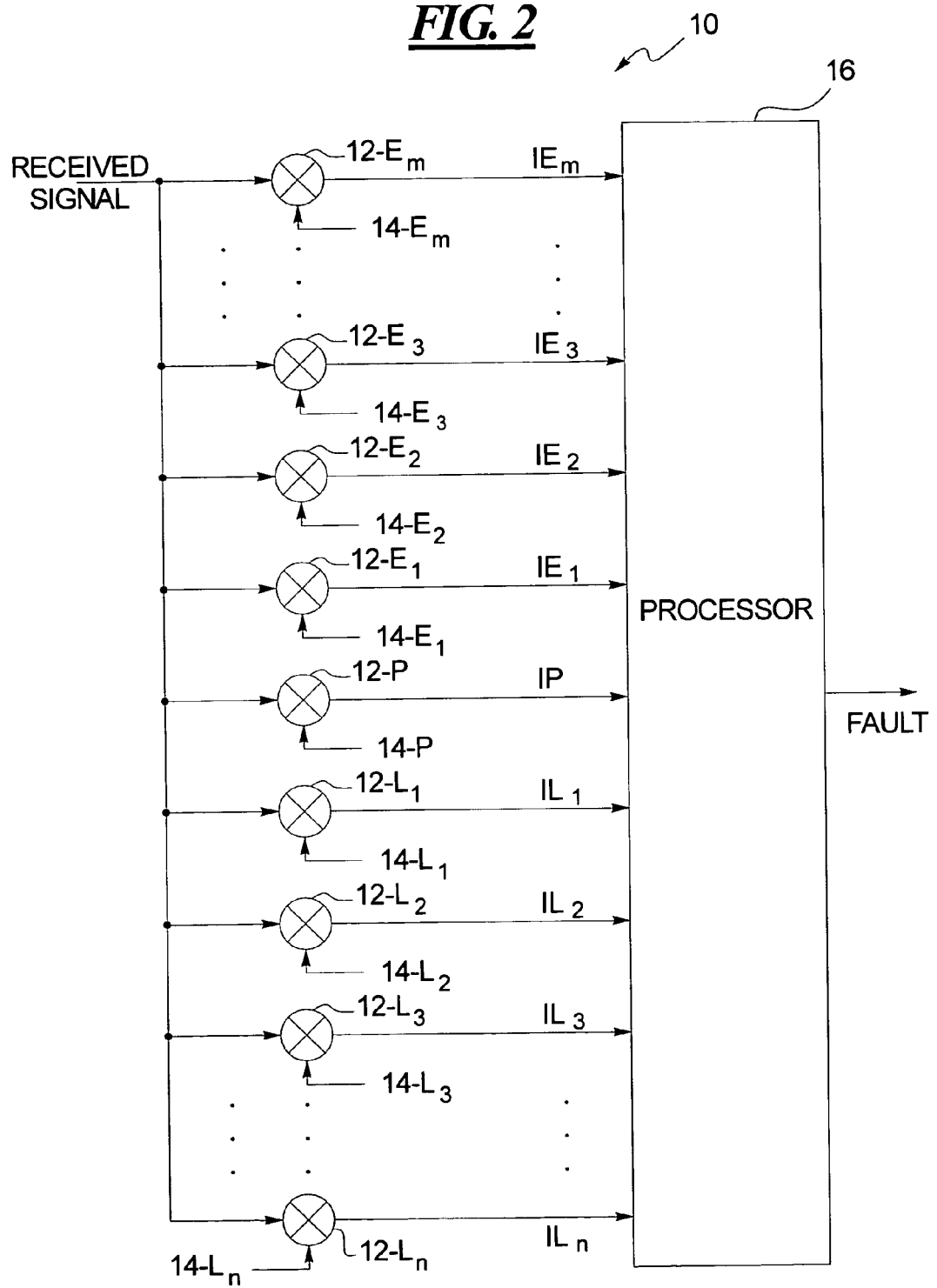

APPARATUS FOR NAVIGATION SATELLITE SIGNAL QUALITY MONITORING

TECHNICAL FIELD OF THE INVENTION

The present invention relates generally to satellite based positioning systems such as the Global Positioning System (GPS) and more particularly to the monitoring of the quality of the signals transmitted by satellites in a satellite based positioning system.

BACKGROUND OF THE INVENTION AND PRIOR ART

A satellite based positioning system is used to determine a position of a receiver and typically includes satellite control facilities, a plurality of satellites, the receiver, and one or more local or regional ground stations. Each of the satellites transmits a signal that contains a code and certain prescribed information useful to the receiver in determining its position. The receiver synchronizes itself to the codes of at least four satellites and uses the information in the signals from these satellites in order to perform a triangulation like procedure so as to determine its coordinates and time offset with respect to a reference, such as the center of the Earth and the GPS standard time.

The receiver is not constrained to a specific location and, therefore, represents a variable position. Indeed, the purpose of the satellite based positioning system is to make it possible for the receiver to determine its position regardless of the location of the receiver. On the other hand, the local or regional ground station is in a fixed location and is used to monitor the signals transmitted by the satellites. The signals transmitted by the satellites can be adversely affected, for example, by atmospheric conditions which can lead to improper position determinations by the receiver. The ground station, therefore, notifies the receiver of any necessary signal corrections to allow the receiver to make more accurate position calculations. This arrangement is referred to as differential positioning.

The ground station of the present invention also monitors the signals transmitted by the satellites in order to detect faults within the satellites. For GPS, these faults are specified by the FAA who imposes stringent requirements to protect users against positioning system signal faults. A set of test waveforms has been chosen by the FAA to represent at least some of the more egregious faults. These waveforms are used for certification testing of the ground station equipment.

The prior art determines faults by comparing conventional code tracking discriminators at different correlator spacings. As shown in FIG. 1, a correlation curve is established by correlating the code received from a satellite with a suite of code references which are time shifted replicas of the code transmitted by that satellite. For example, seven correlation measurements may be calculated as shown in FIG. 1. The in-phase measurement IP represents the amount of correlation between the received code and a reference code that has a zero time shift with respect to the received code (this measurement is referred to as punctual). The in-phase measurement $IE_1$ represents the amount of correlation between the received code and a reference code that has a first predetermined time shift so that it is early with respect to the received code. The in-phase measurement $IL_1$ represents the amount of correlation between the received code and a reference code that has a second predetermined time shift so that it is late with respect to the received code. Similarly, the in-phase measurement $IE_2$ is derived using a third predetermined time shift, the in-phase measurement $IL_2$ is derived using a fourth predetermined time shift, the in-phase measurement $IE_3$ is derived using a fifth predetermined time shift, and the in-phase measurement $IL_3$ is derived using a sixth predetermined time shift. The magnitude of the first predetermined time shift may be equal to the magnitude of the second predetermined time shift, the magnitude of the third predetermined time shift may be equal to the magnitude of the fourth predetermined time shift, and the magnitude of the fifth predetermined time shift may be equal to the magnitude of the sixth predetermined time shift. It is assumed that all measurements are normalized such that the measured correlation is a function of the time shifts only and not the absolute power of the received satellite signal.

First, second, and third discriminators are then formed according to the following equations:

$$d_1 = (IL_1 - IE_1)IP$$

$$d_2 = (IL_2 - IE_2)IP$$

$$d_3 = (IL_3 - IE_3)IP$$

These discriminators are thereafter compared to each other through the formation of quantities $d_{1,2}$, $d_{1,3}$, and $d_{2,3}$ according to the following equations:

$$d_{1,2} = |d_1 - d_2|$$

$$d_{1,3} = |d_1 - d_3|$$

$$d_{2,3} = |d_2 - d_3|$$

The quantities $d_{1,2}$, $d_{1,3}$, and $d_{2,3}$ are compared to corresponding thresholds $D_{1,2}$, $D_{1,3}$, and $D_{2,3}$ such that, if the first discriminator $d_{1,2}$ exceeds $D_{1,2}$, if the second discriminator $d_{1,3}$ exceeds $D_{1,3}$, or if the third discriminator $d_{2,3}$ exceeds $D_{2,3}$, a fault is assumed to exist. During normal operation of the global positioning system, this test is performed on the signals received from each of the satellites. During certification, a test is to be performed using each of the test waveforms chosen by the FAA in order to prove that fault detection occurs.

At least one of the problems with this method is that it is requires six correlators in order to determine the three quantities $d_{1,2}$, $d_{1,3}$, and $d_{2,3}$ which is too much hardware for the amount of useful data being provided.

It is also known for ground stations to determine faults by scanning the whole correlation peak (i.e., the portion of the correlation curve around the punctual in-phase measurement IP) in order to determine whether the peak varies from some prescribed norm by a predetermined amount. However, this fault detection arrangement requires a substantial amount of computing power and it lacks accuracy.

A third method in the prior art uses the following ratios between the measurements IE3, IE2, IE1, IL1, IL2, and IL3:

$$r_{E3,E2} = \frac{IE3}{IE2}$$

$$r_{E3,E1} = \frac{IE3}{IE1}$$

$$r_{E3,L1} = \frac{IE3}{IL1}$$

Each of these ratios is compared to a corresponding predetermined value.

The present invention is directed to an arrangement which overcomes one or more problems of the prior art.

SUMMARY OF THE INVENTION

In accordance with one aspect of the present invention, an apparatus for the detection of positioning system satellite signal faults comprises a correlator and a fault detector. The correlator determines a plurality of correlation measurements at points along a correlation curve, and each correlation measurement is based upon a correlation between a received satellite signal and a reference. The fault detector determines differences between the correlation measurements along the correlation curve and detects a fault from the differences.

In accordance with another aspect of the present invention, a method of detecting faults affecting a signal transmitted by a positioning system satellite comprises: correlating the transmitted signal with a first reference in order to determine a first correlation measurement at a first point along a correlation curve; correlating the transmitted signal with a second reference in order to determine a second correlation measurement at a second point along the correlation curve; correlating the transmitted signal with a third reference in order to determine a third correlation measurement at a third point along the correlation curve; determining a first difference from the first and second correlation measurements; determining a second difference from the second and third correlation measurements; directly comparing the first difference to a first threshold; directly comparing the second difference to a second threshold; and, detecting a fault in the satellite based upon the comparisons of the first and second differences to the first and second thresholds.

In accordance with still another aspect of the present invention, a method of detecting faults affecting a signal transmitted by a positioning system satellite comprises: correlating the transmitted signal with references in order to determine a plurality of correlation measurements at corresponding points along a correlation curve; determining a single value from n pairs of the correlation measurements, wherein n>2; comparing the single value to a threshold; and, detecting a fault in the satellite based upon the comparison.

BRIEF DESCRIPTION OF THE DRAWINGS

These and other features and advantages will become more apparent from a detailed consideration of the invention when taken in conjunction with the drawings in which:

FIG. 2 is a schematic diagram of a portion of a ground station receiver pertinent to the present invention; and, FIG. 3 is a waveform showing a correlation diagram useful in explaining fault detection as implemented by a ground station in a global positioning system in accordance with the present invention.

DETAILED DESCRIPTION

A portion of a ground station 10 pertinent to the present invention is shown in FIG. 2. The ground station has correlators 12-$E_m$, ..., 12-$E_3$, 12-$E_2$, 12-$E_1$, 12-P, 12-$L_1$, 12-$L_2$, 12-$L_3$, ..., 12-$L_n$, where n+m is greater than two, and where n is the number of late correlation measurements and m is the number of early correlation measurements to be used in determining a fault. The correlator 12-P correlates the usual code in the received signal with a reference 14-P to produce a punctual correlation output IP, the correlator 12-$L_1$, correlates the code in the received signal with a reference 14-$L_1$ to produce a late correlation output $IL_1$, the correlator 12-$L_2$ correlates the code in the received signal with a reference 14-$L_2$ to produce a late correlation output $IL_2$, the correlator 12-$L_3$ correlates the code in the received signal with a reference 14-$L_3$ to produce a late correlation output $IL_3$, ..., and the correlator 12-$L_n$ correlates the code in the received signal with a reference 14-$L_n$ to produce a late correlation output $IL_n$.

In addition, a correlator 12-$E_1$ correlates the code in the received signal with a reference 14-$E_1$ to produce an early correlation output $IE_1$, a correlator 12-$E_2$ correlates the code in the received signal with a reference 14-$E_2$ to produce an early correlation output $IE_2$, a correlator 12-$E_3$ correlates the code in the received signal with a reference 14-$E_3$ to produce an early correlation output $IE_3$, ..., and a correlator 12-$E_m$ correlates the code in the received signal with a reference 14-$E_m$ to produce an early correlation output $IE_m$.

The ground station 10 has a processor 16 which uses the punctual and late correlation outputs IP, $IL_1$, $IL_2$, $IL_3$, ..., $IL_n$ as disclosed hereinafter in order to determined whether a fault exists. Alternatively or additionally, the processor 16 can use the early correlation outputs $IE_1$, $IE_2$, $IE_3$, ..., $IE_m$ as disclosed hereinafter in order to determine whether a fault exists.

Figure 1:
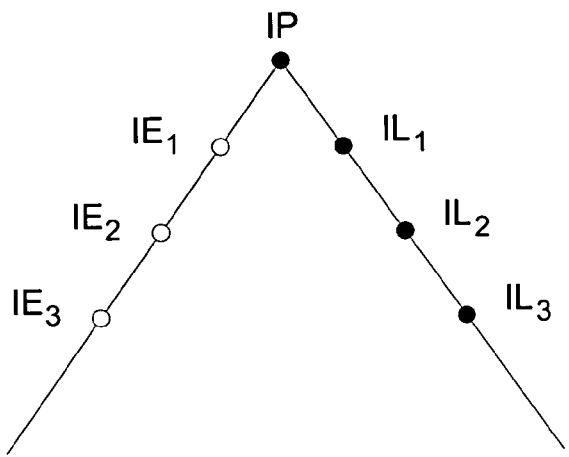
FIG. 1 is a waveform showing a correlation diagram useful in explaining prior art fault detection as implemented in a ground station in a global positioning system.
Figure 3:
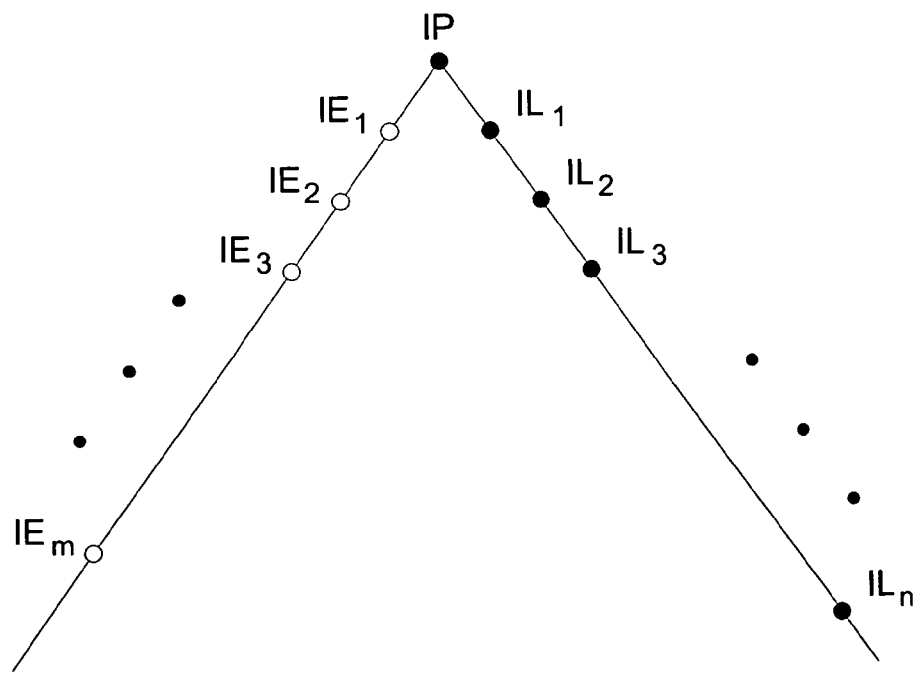

In order to generate the punctual correlation output IP, the processor 16 shifts the reference 14-P, which may be a replica of the code contained in the received signal, until an optimum correlation is obtained. The processor 16 then controls the reference 14-$L_1$ so that the reference 14-$L_1$ is a replica of the reference 14-P and so that the reference 14-$L_1$ is time shifted with respect to the reference 14-P by a first predetermined amount of time. Accordingly, the correlator 12-$L_1$ produces the late correlation output $IL_1$. The processor 16 also controls the reference 14-$L_2$ so that the reference 14-$L_2$ is a replica of the reference 14-P and so that the reference 14-$L_2$ is time shifted with respect to the reference 14-P by a second predetermined amount of time, where the second predetermined amount of time is greater than the first predetermined amount of time. Accordingly, the correlator 12-$L_2$ produces the late correlation output $IL_2$. Similarly, the processor 16 controls the reference 14-$L_3$ so that the reference 14-$L_3$ is a replica of the reference 14-P and so that the reference 14-$L_3$ is time shifted with respect to the reference 14-P by a third predetermined amount of time, where the third predetermined amount of time is greater than the first and second predetermined amounts of time. Accordingly, the correlator 12-$L_3$ produces the late correlation output $IL_3$. The remaining late correlation outputs up to $IL_n$ are generated in a like manner. The first, second, third, etc. predetermined amounts of time are all chosen so that the late correlation outputs $IL_1$ through $IL_n$ are all on the downward or late slope of the correlation curve as shown in FIG. 3.

Additionally or alternatively, the correlators 12-$E_1$, 12-$E_2$, 12-$E_3$, ..., 12-$E_m$ may be positioned so as to generate the early correlation outputs $IE_1$, $IE_2$, $IE_3$, ..., $IE_m$. Also, quadrature phase correlation outputs $QE_m$, ... $QE_1$, QP, $QL_1$, ..., $QL_n$ may be generated by correlating the code in the received signal to a time shifted quadrature form of the reference 14-P. In accordance with this latter alternative, each measurement used to generate a fault indication may be formed as an RMS (Root Mean Square) value of the corresponding in phase and quadrature phase measurements.

The set $IE_m, \ldots, IE_3, IE_2, IE_1, IP, IL_1, IL_2, IL_3, \ldots, IL_n$ may be denoted as $I_m, \ldots, I_{-3}, I_{-2}, I_{-1}, I_0, I_1, I_2, I_3, \ldots, I_n$ and the following corresponding set of RMS values $$\sqrt{IE_m^2+QE_m^2}, \ldots, \sqrt{IE_1^2+QE_1^2}, \sqrt{IP^2+QP^2}, \ldots, \sqrt{IL_n^2+QL_n^2}$$

may be denoted as $R_m, \ldots, R_{-3}, R_{-2}, R_{-1}, R_0, R_1, R_2, R_3, \ldots, R_n$.

If early as well as late correlation outputs are to be used for fault detection, the processor 16 processes the early correlation outputs $IE_m$ through $IE_1$, the punctual correlation output IP, and/or the late correlation outputs $IL_1$ through $IL_n$ so as to derive one or more measured differences $d_{i,j}$. These measured differences $d_{i,j}$ are generated in accordance with the following equations:

$$d_{i,j}=I_i-I_j \tag{1}$$

or $$d_{i,j}=R_i-R_j \tag{2}$$

where $i=-m, \ldots, n$ and $j=-m, \ldots, n$, and where the negative sign indicates measurements on the early slope and the positive sign indicates measurements on the late slope of the correlation curve.

At this point, it is possible to subtract the expected difference from all or a subset of these measured differences di,j and to compare the resulting difference deviations to corresponding thresholds in order to determine the existence of a fault. For example, assuming that all of these difference deviations are used, then these difference deviations may be compared to corresponding thresholds in accordance with the following equation:

$$|d_{i,j}-Ed_{i,j}|>D_{i,j} \tag{3}$$

where $Ed_{i,j}$ is the difference that is expected for each corresponding measured difference $d_{i,j}$ when there is no fault.

In some cases, the measured differences $d_{i,j}$ may be affected by thermal and multipath noise which could lead to false detection of faults, depending upon the sensitivity of the fault detection apparatus, i.e., the magnitudes of the thresholds $D_{i,j}$. Accordingly, in these cases, a fault could be detected when no fault is in fact present, or a fault which is present might not be detected at all.

The thermal noise content in $d_{i,j}$ can be determined as a function of the delay $h_{i,j}$ between the reference codes 14-$E_m$, . . . , 14-$E_3$, 14-$E_2$, 14-$E_1$, 14-P, 14-$L_1$, 14-$L_2$, 14-$L_3$, . . . , 14-$L_n$. The delay $h_{i,j}$ is the delay between the two references that are correlated with the received signal to produce $I_i$ and $I_j$. Typically, $h_{i,j}=0.025$ to $0.05$ chip, but may vary from this range. The thermal noise th1 in $d_{i,j}$ depends on the signal to noise ratio and the standard deviation (1-sigma) of th1 and is given by the following equation:

$$\sigma_{th1}(i,j) = 293\sqrt{\frac{h_{i,j}B}{S/No}} \tag{4}$$

where B is the two-sided bandwidth of the noise. In addition, there is another contribution, th2, to the thermal noise due to the variation of the punctual reference (i.e., the reference 14-P). Accordingly, the total thermal noise is th=th1+th2. The multipath noise mp depends on the antenna gain pattern and its overbounding 1-sigma $\sigma_{mp}(i,j)$ (ë) is expressed as a function of satellite elevation ë. The statistical properties of th and mp are usually identified at installation of the ground station and the statistical information is parameterized and are thereafter stored in memory.

One way to minimize any adverse effects of thermal and multipath noise is to make a plurality of measurements for each of the measured differences $d_{i,j}$ that are used in the detection of faults. Then, the measurements for each of the measured differences $d_{i,j}$ may be averaged or filtered. Because the thermal noise and some of the multipath noise are not particularly correlated from one measurement to the next, averaging will tend to reduce the effects of thermal and multipath noise.

As an example, let it be assumed that the punctual correlation output IP and the late correlation outputs $IL_1$ and $IL_2$ are used to detect faults. Accordingly, the following measured differences are determined: $d_{0,1}=IP-IL_1$; $d_{0,2}=IP-IL_2$; and, $d_{1,2}=IL_1-IL_2$. In order to reduce the effects of thermal and multipath noise, however, plural calculations of the measured difference $d_{0,1}$ are made based upon plural correlation measurements resulting in plural punctual correlation outputs IP and plural late correlation outputs $IL_1$. All such calculations of the measured difference $d_{0,1}$ are then averaged. Similarly, plural calculations of the measured difference $d_{0,2}$ are made based upon the plural correlation measurements resulting in plural punctual correlation outputs IP and plural late correlation outputs $IL_2$. As before, all such calculations of the measured difference $d_{0,2}$ are averaged. Likewise, plural calculations of the measured difference $d_{1,2}$ are made based upon the plural correlation measurements resulting in the plural late correlation outputs $IL_1$ and plural late correlation outputs $IL_2$. Again, all such calculations of the measured difference $d_{1,2}$ are averaged. These averages may then be compared to their corresponding thresholds $D_{0,1}$, $D_{0,2}$, and $D_{1,2}$ in order to determine the existence of a fault.

Another way to reduce the effect of thermal and multipath noise is to suitably filter the measured differences $d_{i,j}$ or the punctual correlation output IP, the late correlation outputs $IL_1$ through $IL_n$, and the early correlation outputs $IE_1$ through $IE_m$, such as with a low pass filter.

Still another way to reduce the effect of thermal and multipath noise is by implementing the following procedure. In describing this procedure, it is useful to define a covariance matrix P in accordance with the following equation:

$$P=E[(\underline{d}-\underline{m})(\underline{d}-\underline{m})^T] \tag{5}$$

where the underlines indicate vectors, where E[A] is the statistical expectation of A, where the vector m is the mean value of the vector $d$, and where the vector $d$ is determined in accordance with the following equation:

$$\underline{d}^T=(d_1, d_2, d_3, d_4, \ldots, d_N) \tag{6}$$

where $d_k=I_k-I_{k-1}-Ed_k$ for $k=-m, \ldots, n-1$ or where $d_k=R_k-R_{k-1}-Ed_k$ for $k=-m, \ldots, n-1$ assuming N+1 correlation measurements such as $I_m, \ldots, I_{-3}, I_{-2}, I_{-1}, I_0, I_1, I_2, I_3, \ldots, I_n$. An upper triangular matrix U and a diagonal matrix D are determined according to the following equation:

$$P=UDU^T \tag{7}$$

where P is the covariance matrix given by equation (6). With the covariance matrix P known from equation (6), the upper triangular matrix U and the diagonal matrix D can be determined, for example, by using Cholesky factorization.

Thus, the following relationship may be defined in accordance with the following equation:

$$\tilde{d} = U^{-1}(\underline{d} - \underline{m}) \quad (8)$$

where $\tilde{d}$ is a vector representing the decorrelated deviations generating the vector $\underline{d}$. Equation (8) can be re-written according to the following equation:

$$\underline{d} = U + \tilde{d} + \underline{m} \quad (9)$$

Then, combining equations (5) and (9) produces the following equation:

$$P = E[U\tilde{d}(U\tilde{d})^T] = UE[\tilde{d}(\tilde{d})^T]U^T \quad (10)$$

By comparing equations (7) and (10), it can be seen that D is given by following equation:

$$D = E[\tilde{d}(\tilde{d})^T] \quad (11)$$

and that D, as defined above, is a diagonal matrix having the following format:

$$D = \begin{bmatrix} \tilde{\sigma} & 0 & 0 & \dots & 0 \\ 0 & \tilde{\sigma} & 0 & \dots & 0 \\ 0 & 0 & \tilde{\sigma} & \dots & 0 \\ \vdots & \vdots & \vdots & \vdots & \vdots \\ 0 & 0 & 0 & \dots & \tilde{\sigma} \end{bmatrix} \quad (12)$$

Variances $\sigma_i^2$ are then determined from the diagonal matrix D. As can be seen from the above equations, the deviations in the vector $\tilde{d}$ where i varies from 1 to N are uncorrelated and have the variances $\sigma_i^2$.

The final $\chi^2$ value for determining a fault is obtained according to the following equation:

$$d[\chi^2] = \sum_{i=1}^{n} \frac{\tilde{d}_i^2}{\tilde{\sigma}_i^2} \quad (13)$$

A normalization to a $\sigma = 1$ as required in the definition of $\chi^2$ will be performed in equation (13). The value $d[\chi^2]$ is a single value which has reduced thermal and multipath noise, which represents information regarding a plurality of correlation measurements, and which may be compared to a threshold D in order to determine the existence of a fault.

Certain modifications of the present invention have been discussed above. Other modifications will occur to those practicing in the art of the present invention. For example, as described above, the $\chi^2$ distribution is based on the assumption that all involved distributions are Gaussian. The distributions of $d_k$ may deviate from this assumption and appropriate corrections to the formulas given here may be necessary.

Moreover, the present invention has been described above in connection with the detection of satellite signal faults such as those specified by the FAA. These faults result in signal distortions detectable by use of the present invention. The present invention as embodied by the following claims can also be used to detect other signal distortions such as those arising from multipath and satellite code cross correlation effects.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. An apparatus for the detection of positioning system satellite signal distortions comprising:
   a correlator that determines a plurality of correlation measurements at points along a correlation curve, wherein each correlation measurement is based upon a correlation between a received satellite signal and a reference; and,
   a signal distortion detector that determines differences between the correlation measurements along the correlation curve and that detects a signal distortion from the differences, wherein the signal distortion detector detects the signal distortion by forming deviations according to the following expressions:

$$d_{i,j} - Ed_{i,j}$$

wherein each $d_{i,j}$ is a difference between a pair of correlation measurements i and j, wherein $Ed_{i,j}$ is an expected value of the difference $d_{i,j}$, and wherein the signal distortion detector compares each of the deviations to a corresponding threshold in order to detect existence of the signal distortion.

2. The apparatus of claim 1 wherein each of the correlation measurements represents a different time shift between the reference and the satellite signal.

3. The apparatus of claim 2 wherein all of the different time shifts are late time shifts.

4. The apparatus of claim 2 wherein all of the different time shifts are early time shifts.

5. The apparatus of claim 2 wherein the different time shifts include a late time shift and an early time shift.

6. The apparatus of claim 2 wherein the different time shifts also includes a zero time shift.

7. The apparatus of claim 1 wherein the signal distortion detector determines a single deviation value based upon the deviations, and wherein the signal distortion detector compares the single deviation value to a threshold in order to detect existence of the signal distortion.

8. The apparatus of claim 1 wherein the signal distortion detector determines a covariance matrix based upon statistical properties of the deviations, and wherein the signal distortion detector uses the covariance matrix to perform a $\chi^2$ procedure on the deviations to create a single deviation indicative of the signal distortion.

9. The apparatus of claim 1 wherein $E_{i,j}$ is an expected value of the difference $d_{i,j}$ when there is no signal distortion.

10. The apparatus of claim 1 wherein the signal distortion detector detects the signal distortion in accordance with the following expressions:

$$|d_{i,j} = -Ed_{i,j}| > D_{i,j}$$

and wherein $D_{i,j}$ is a threshold comprise the corresponding thresholds.

11. The apparatus of claim 10 wherein the signal distortion detector performs averaging in order to reduce effects of thermal and multipath noise.

12. The apparatus of claim 10 wherein the signal distortion detector performs filtering in order to reduce effects of thermal and multipath noise.

13. An apparatus for the detection of positioning system satellite signal distortions comprising:

a correlator that determines a plurality of correlation measurements at points along a correlation curve, wherein each correlation measurement is based upon a correlation between a received satellite signal and a reference; and, a signal distortion detector that determines differences between the correlation measurements along the correlation curve and that detects-a signal distortion from the differences, wherein the signal distortion detector performs averaging in order to reduce effects of thermal and multipath noise.

14. An apparatus for the detection of positioning system satellite signal distortions comprising:

a correlator that determines a plurality of correlation measurements at points along a correlation curve, wherein each correlation measurement is based upon a correlation between a received satellite signal and a reference; and, a signal distortion detector that determines differences between the correlation measurements along the correlation curve and that detects a signal distortion from the differences, wherein the signal distortion detector performs filtering in order to reduce effects of thermal and multipath noise.

15. A method of detecting signal distortions affecting a signal transmitted by a positioning system satellite comprising:

correlating the transmitted signal with a first reference in order to determine a first correlation measurement at a first point along a correlation curve;

correlating the transmitted signal with a second reference in order to determine a second correlation measurement at a second point along the correlation curve;

correlating the transmitted signal with a third reference in order to determine a third correlation measurement at a third point along the correlation curve;

determining a first difference from the first and second correlation measurements;

determining a second difference from the second and third correlation measurements;

directly comparing the first difference to a first threshold;

directly comparing the second difference to a second threshold; and, detecting a signal distortion in the satellite based upon the comparisons of the first and second differences to the first and second thresholds.

16. The method of claim 15 further comprising determining a third difference from the first and third correlation measurements and directly comparing the third difference to a third threshold, wherein the detection of a signal distortion comprises detecting a signal distortion in the satellite based upon the comparison of the first, second, and third differences to the first, second, and third thresholds.

17. The method of claim 15 wherein the first, second, and third correlation measurements represent different time shifts between the reference and the transmitted signal.

18. The method of claim 17 wherein all of the different time shifts are late time shifts.

19. The method of claim 17 wherein all of the different time shifts are early time shifts.

20. The method of claim 17 wherein the different time shifts include late and early time shifts.

21. The method of claim 17 wherein the different time shifts also includes a zero time shift.

22. The method of claim 15, 16, 17, 18, 19, 20, or 21 wherein the detection of the signal distortion comprises:

forming a deviation between each of the first and second differences and a corresponding expected value for the difference; and, comparing each of the deviations to a corresponding threshold in order to detect existence of the signal distortion.

23. The method of claim 15 wherein the detection of the signal distortion comprises:

forming a deviation between each of the differences and a corresponding expected value of the difference;

determining a single deviation value based upon the deviations; and, comparing the single deviation value to a threshold in order to detect existence of the signal distortion.

24. The method of claim 15 wherein the detection of the signal distortion comprises:

forming a deviation between each of the differences and a corresponding expected value of the difference;

determining a covariance matrix and mean values based upon statistical properties of the deviations; and, using the covariance matrix and mean values to perform a $\chi^2$ procedure on the deviations to create a single deviation value indicative of the signal distortion.

25. The method of claim 24 wherein the detection of the signal distortion comprises comparing the single deviation value to a threshold in order to detect existence of the signal distortion.

26. The method of claim 15, 16, 17, 18, 19, 20, or 21 wherein the detection of the signal distortion comprises detecting the signal distortion in accordance with the following expression:

$$d_{i,j} - Ed_{i,j}$$

wherein $d_{i,j}$ is the difference between correlation measurements i and j, and wherein $Ed_{i,j}$ is the expected value of the difference $d_{i,j}$ when there is no signal distortion.

27. The method of claim 15, 16, 17, 18, 19, 20, or 21 wherein the detection of the signal distortion comprises detecting the signal distortion in accordance with the following expression:

$$|d_{i,j} - Ed_{i,j}| > D_{i,j}$$

wherein $d_{i,j}$ is the difference between correlation measurements i and j, wherein $Ed_{i,j}$ is the expected value of the difference $d_{i,j}$ when there is no signal distortion, and wherein $D_{i,j}$ is a threshold.

28. The method of claim 15, 16, 17, 18, 19, 20, or 21 wherein the detection of the signal distortion comprises performing averaging in order to reduce effects of thermal and multipath noise.

29. The method of claim 15, 16, 17, 18, 19, 20, or 21 wherein the detection of the signal distortion comprises filtering in order to reduce effects of thermal and multipath noise.

30. A method of detecting signal distortions affecting a signal transmitted by a positioning system satellite comprising:

correlating the transmitted signal with references in order to determine a plurality of correlation measurements at corresponding points along a correlation curve;

determining a single value from N values, wherein each value is formed based on a pair of correlation measurements, and wherein N>2;

comparing the single value to a threshold; and, detecting a signal distortion in the satellite based upon the comparison.

31. The method of claim 30 wherein each of the correlation measurements represents a different time shift between the references and the transmitted signal.

32. The method of claim 31 wherein all of the time shifts are late time shifts.

33. The method of claim 31 wherein all of the time shifts are early time shifts.

34. The method of claim 31 wherein at least one of the time shifts is a late time shift, and wherein at least one of the time shifts is an early time shift.

35. The method of claim 31 wherein the different time shifts also includes a zero time shift.

36. The method of claim 30 wherein the determination of the single value comprises:
   forming N differences between pairs of the correlation measurements; and,
   determining the single value from deviations between the N difference and corresponding expected values of the N differences.

37. The method of claim 30 wherein the determination of the single value comprises:
   forming N differences between pairs of the correlation measurements;
   forming deviations between the N differences and expected values of the N differences;
   determining a covariance matrix and mean values based upon statistical properties of the deviations;
   using the covariance matrix and mean values to decorrelate the deviations in order to form new deviations that are not correlated; and,
   performing a $\chi^2$ procedure on the decorrelated deviations to determine the single value.

38. The method of claim 37 wherein the use of the covariance matrix and mean values to decorrelate the deviations comprises using the covariance to form decorrelated and normalized deviations, and wherein the $\chi^2$ procedure is performed on the decorrelated and normalized deviations to determine the single value.

39. The method of claim 30 further comprising averaging in order to reduce effects of thermal and multipath noise.

40. The method of claim 30 further comprising filtering in order to reduce effects of thermal and multipath noise.

41. The method of claim 30 wherein the determination of the single value from N pairs of the correlation measurements comprises:
   defining a covariance matrix P in accordance with the following equation:

$$P = E[(\underline{d}-\underline{m})(\underline{d}-\underline{m})^T]$$

wherein the underlines indicate vectors, wherein E[A] is a statistical expectation of A, wherein the vector $\underline{m}$ is the mean value of the vector $\underline{d}$, wherein the vector $\underline{d}$ is determined in accordance with the following equation:

$$\underline{d}^T = (d_1, d_2, d_3, d_4 \ldots, d_N)$$

wherein N is the number of deviations, wherein the deviations $d_K$ are formed from pairs of the correlation measurements $I_i$ and $I_j$ according to the following equation:

$$d_k = I_k - I_{k-1} - Ed_k$$

wherein $Ed_K$ is expected value of $d_K$;
   determining an upper triangular matrix U and a diagonal matrix D according to the following equation:

$$P = UDU^T$$

defining $\tilde{d}$ in accordance with the following equation:

$$\tilde{d} = U^{-1}(\underline{d}-\underline{m})$$

wherein $\tilde{d}$ is a vector representing the decorrelated deviations generating the vector d;
   producing the following equation from the equations above:

$$P = E[U\tilde{d}(U\tilde{d})^T] = UE[\tilde{d}(\tilde{d})^T]U^T$$

determining the following equation from the equations above:

$$D = E[\tilde{d}(\tilde{d})^T]$$

wherein D has the following format:

$$D = \begin{bmatrix} \tilde{\sigma} & 0 & 0 & \ldots & 0 \\ 0 & \tilde{\sigma} & 0 & \ldots & 0 \\ 0 & 0 & \tilde{\sigma} & \ldots & 0 \\ \vdots & \vdots & \vdots & \vdots & \vdots \\ 0 & 0 & 0 & \ldots & \tilde{\sigma} \end{bmatrix}$$

determining variances $\sigma_i^2$ from D above;
   determining a final $\chi^2$ value according to the following equation:

$$d[\chi^2] = \sum_{i=1}^{n} \frac{\tilde{d}_i^2}{\tilde{\sigma}_i^2}$$

and comparing $d[\chi^2]$ to a threshold D in order to determine existence of a signal distortion.

42. A method of detecting signal distortions affecting a signal transmitted by a positioning system satellite comprising:
   correlating the transmitted signal with a first reference in order to determine a first correlation measurement at a first point along a correlation curve, wherein the first point is the peak of the correlation curve;
   correlating the transmitted signal with a second references in order to determine a second correlation measurement at a second point along the correlation curve, wherein the second reference is time shifted with respect to the first reference by a first predetermined amount;
   correlating the transmitted signal with a third references in order to determine a third correlation measurement at a second point along the correlation curve, wherein the third reference is time shifted with respect to the first reference by a second predetermined amount;
   determining at least first and second differences between first and second pairs of the first, second, and third correlation measurements;
   comparing the first and second differences to corresponding thresholds; and,
   detecting a signal distortion in the satellite based upon the comparisons of the first and second differences to the corresponding thresholds.

43. The method of claim 41 wherein the first, second, and third references are substantially identical to one another except for the time shifts.

* * * * *